United States Patent [19]

Hough

[11] Patent Number: 4,993,452
[45] Date of Patent: Feb. 19, 1991

[54] LOW PRESSURE CHECK VALVE

[75] Inventor: Walter J. Hough, Columbus, Ind.

[73] Assignee: Cummins Engine Company, Inc., Columbus, Ind.

[21] Appl. No.: 455,260

[22] Filed: Dec. 22, 1989

[51] Int. Cl.⁵ .............................................. F16K 15/16
[52] U.S. Cl. ................................ 137/515.7; 137/847; 137/850
[58] Field of Search .................... 137/846–850, 137/515.7

[56] References Cited

U.S. PATENT DOCUMENTS

| | | | |
|---|---|---|---|
| 187,411 | 2/1877 | Painter | 137/850 |
| 615,751 | 12/1898 | Sands. | |
| 657,007 | 8/1900 | Richter | 137/846 X |
| 3,060,882 | 10/1962 | Peters | 137/846 X |
| 3,422,844 | 1/1969 | Grise. | |
| 3,504,699 | 4/1970 | Grise | 137/846 |
| 3,618,632 | 11/1971 | Stevens | 137/846 X |
| 4,324,097 | 4/1982 | Schmitt et al. . | |
| 4,404,795 | 9/1983 | Oishi et al. . | |
| 4,494,575 | 1/1985 | Galdstone . | |
| 4,607,663 | 8/1986 | Raftis | 137/850 X |
| 4,615,173 | 10/1986 | Usui et al. . | |
| 4,631,917 | 12/1986 | Wales . | |

FOREIGN PATENT DOCUMENTS 1308977 10/1962 France ........................... 137/846

*Primary Examiner*—Robert G. Nilson
*Attorney, Agent, or Firm*—Sixbey, Friedman, Leedom & Ferguson

[57] ABSTRACT

An exhaust gas aftertreatment system having an air supply system is disclosed and includes an air feeding pump for selectively creating a flow of air through a flow passage which directs the flow of air to a regeneration system. A check valve is provided including a valve element having a circular base portion surrounding and supported by the flow passage, a flexing portion extending from the circular base portion and converging to form a diametrically extending tip, and a diametrical slit formed in the tip. Also, a support structure is positioned to extend into the valve element to a position adjacent the tip for supporting the flexing portion such that the valve element permits the flow of air from the air feeding pump in one direction and prevents the flow of exhaust gas in an opposite direction with the support structure preventing the valve element from collapsing when the air feeding pump is inoperable.

23 Claims, 4 Drawing Sheets

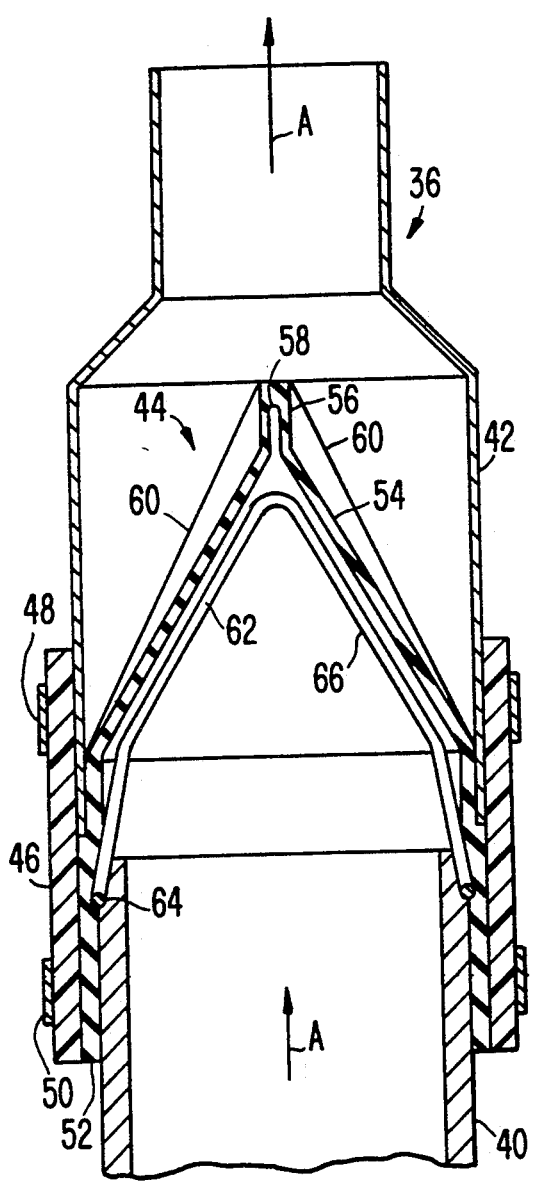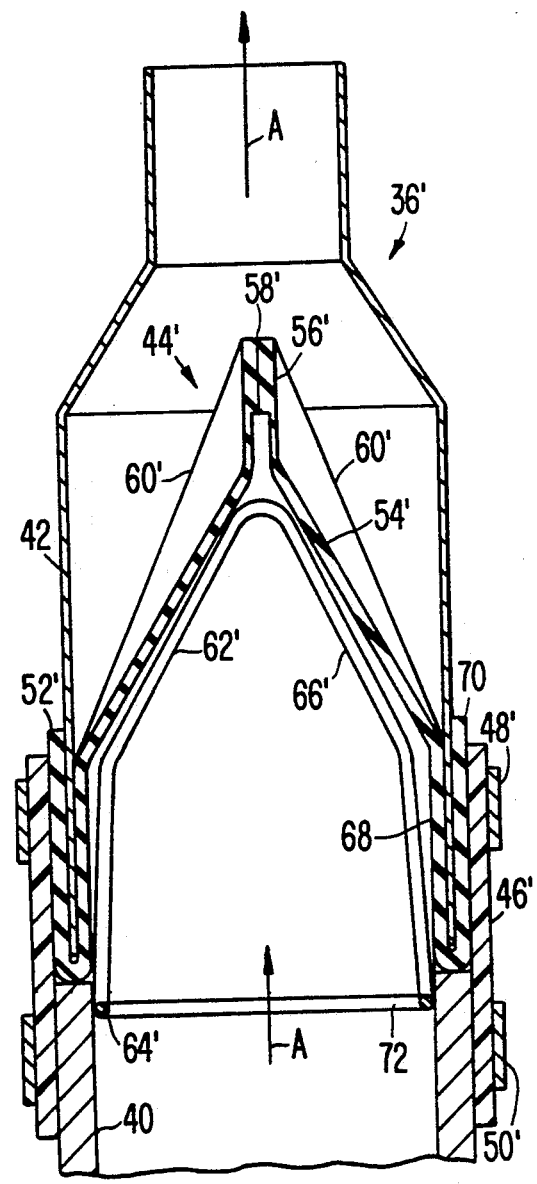

LOW PRESSURE CHECK VALVE

TECHNICAL FIELD

The present invention relates to a low cost check valve for preventing the back flow of fluid. More particularly, the present invention relates to a low cost check valve for preventing hot exhaust gas back flow through an air supply system of a diesel exhaust gas aftertreatment system when in a trapping mode.

BACKGROUND OF THE INVENTION

By the year 1991, the particulate emission standards set by the Environmental Protection Agency (EPA) will require all urban buses to emit less than 0.1 gm/hp-hr of particulate matter. Further, by the year 1994, these standards will apply to all heavy duty trucks as well. Particulates are defined by EPA as any matter in the exhaust of an internal combustion engine, other than condensed water, which is capable of being collected by a standard filter after dilution with ambient air at a temperature of 125° F. Included in this definition are, agglomerated carbon particles, absorbed hydrocarbons, including known carcinogens, and sulfates.

These particulates are very small in size, with a mass median diameter of 0.1-1.0 micrometers, and are extremely light weight. During the life of the typical vehicle, approximately 20 cubic feet of particulate matter which must be trapped will be emitted per 100,000 miles of engine operation. This amounts to slightly less than 100 lbs. of particulate matter. Obviously this particulate matter cannot be stored within the vehicle because one pound of particulate occupies a volume of approximately 350 cubic inches. Therefore, in order to meet these rigorous standards, there is a need for a filtration system which will efficiently, economically, and reliably remove these particulates from the exhaust emission of these vehicles.

A number of filtration systems have been developed over the years which employ a honeycomb or similar ceramic monolithic structure which is capable of trapping the small, light weight particulates as the exhaust gas is restricted to flow through such structure. However, after a predetermined amount of particulate matter is trapped by the filtration system or a predetermined period of time has lapsed, the ceramic structure must be regenerated, that is the particulate matter trapped within the structure must be oxidized. This is carried out in a variety of ways all of which are designed to significantly raise the temperature of the air or exhaust gas flowing through the ceramic structure as well as the ceramic structure itself.

One such regeneration system is disclosed in U.S. Pat. No. 4,404,795 issued to Oishi et al. The system includes a ceramic filter element for trapping particulate matter contained in the exhaust gas as such gas is passed therethrough. Once a predetermined amount of particulate matter has been trapped or a predetermined time period has lapsed, the filter is regenerated by way of electrically heated coils and ambient air, which is provided by way of an electric air feeding pump. The air stream is mixed with the exhaust gas and passed over the coils where such air/exhaust mixture is heated and passed through the filter to oxidize the particulate matter trapped therein. In order to prevent the backflow of exhaust gas into the air feeding pump a check valve is provided for allowing the flow of air in only a single direction.

With temperatures reaching a level of approximately 600° C. within the aftertreatment system during a regeneration phase, and exhaust gas back pressures reaching a value of 3.0 psi during normal operation, it is imperative that the check valve employed to prevent the backflow of exhaust gas be resistant to these extraneous effects while also being resilient enough to allow air from an air feeding pump to flow therethrough when desired.

A similar exhaust gas aftertreatment system is disclosed in U.S. Pat. No. 4,581,891 issued to Usui et al. In this aftertreatment system a diesel fueled burner is employed which is periodically ignited by way of an igniter in response to a sensed condition within the exhaust gas stream. Once ignited the burning aspirated fuel will raise the exhaust gas temperature to approximately 600° C. order to regenerate the particulate filter. In order for the aspirated fuel to properly ignite, a proper air/fuel mixture must be attained within the combustion chamber of the burner. Air for forming the proper air/fuel mixture is supplied to the combustion chamber by way of an air pump. However, with the above mentioned aftertreatment system, the air pump is not protected from the extreme temperatures which may be generated within the aftertreatment system nor is there any effort made to prevent the emission of particulate matter through the air pump during normal operating conditions.

One example of a flexible check valve is disclosed in U.S. Pat. No. 615,751 issued to Sands. The check valve is formed of rubber which must be of a significant thickness in order to resist deformation due to pack pressure while being resilient enough to allow fluid flow in a desired direction. Consequently, in instances where the back pressure is significant, the check valve would necessarily include thick walls which may not be readily opened by the forward flowing fluid pressure. Likewise, if the wall thickness is not sufficient to withstand the back pressure exerted thereon, it will collapse and turn inside out rendering the valve inoperable.

In an attempt to overcome the shortcoming discussed above, a highly flexible check valve is disclosed in U.S. Pat. No. 3,422,844 issued to Grise. This check valve is employed to control the direction of fluid flow therethrough in hydraulic systems. The check valve is formed of a relatively soft and resilient material with a pair of stiffening ribs for aiding in the check valves resistance to back pressure. Further, when the check valve is subjected to a significant back pressure, the valve is collapsed against a metallic plate which diametrically spans the base portion of the check valve to maintain the valve in a closed position, and to prevent the valve from turning inside out. This allows the body of the check valve to be made relatively thin when compared to the check valve discussed above. When the resilient valve member is subjected to increased back pressure, the deformation of the tapered walls is accompanied by substantial compression and deformation of the stiffening ribs. Further, there is a significant angular displacement of the extending portion of the valve about the base portion forming a circular hinge. Over time, this continued pivotal movement between an open positive flow condition and a closed and compressed condition may result in the permanent deformation of the check valve wherein the valve member may not retain its original configuration and consequently may not properly close thereby allowing unwanted fluid to pass therethrough. Further, continued pivotal movement of the valve member about the circular hinge may eventually exceed the valve's elastic limit and fracture the valve member at the hinge point resulting in leakage about the valve member. Each of these instances would require the shutdown of the system in which the valve is employed in order to replace the valve member. Also, because the valve member is permitted to flex through such a great distance, it is necessary to provide a stop plate of a size which significantly impedes the flow of fluid through the valve.

Therefore, there is clearly a need for a check valve which may be formed of a relatively thin flexible material which is prevented from deforming beyond its elastic limit and which will reliably open and close when necessary. Further, such a need particularly exists in the environment of an exhaust gas aftertreatment system wherein it is critical to provide the proper amount of air in order to oxidize particulate matter and protect the air feed pump from high temperature exhaust gas. Also, the check valve must be capable of preventing the leakage of untreated exhaust gas through the air feed pump and into the atmosphere.

SUMMARY OF THE INVENTION

It is a primary object of the present invention to provide a check valve which will reliably open or close when necessary and which will effectively resist back pressure existing in a fluid flow system.

Another object of the present invention is to provide a check valve formed of a relatively thin flexible material and to prevent the check valve from deforming beyond its elastic limit by providing a support structure which permits only a minimal amount of displacement of the check valve in the axial direction when subjected to back pressure.

Yet another object of the present invention is to provide an air flow passage which readily receives and supports a check valve and which may be easily disassembled to replace the components of the air flow system. Such is achieved by providing a flow passage formed of two co-extensive or coaxial tubular members, a valve element having a circular base portion surrounding and supported by one of the tubular members and a resilient cylindrical sleeve positioned in contact with one of the tubular members and the base portion of the valve element and which is clamped in place for sealing the joint between the tubular members and fixing the tubular members relative to one another.

Yet another object of the present invention is to provide a check valve which is permitted to collapse only a minimal amount when subjected to back pressure existing in a fluid flow system. The check valve including a circular base portion, a flexing portion extending from the circular base portion and converging to form a diametrically extending tip, a diametrical slit formed in and extending substantially the entire length of the tip, a pair of diametrically opposed elongated stiffening ribs and a support structure extending into the check valve to a position adjacent the tip; will properly open and close when required and will resist the inherent tendency of the flexible portion to pivot about the circular base portion and turn inside out.

Still a further object of the present invention is to provide a supporting structure for a check valve which will not interfere with the operation of the check valve or impede the flow of fluid therethrough. The support structure is adapted to extend into the check valve to a position adjacent a tip of the check valve and is formed of a thin wire like material and extends perpendicular to a plane including the diametrical tip of the check valve.

These as well as other objects of the present invention are achieved by providing a check valve including a rigid cylindrical housing formed of two co-extensive tubular members; a valve element having a circular base portion surrounding and supported by one of the tubular members, a flexing portion extending from the circular base portion and converging to form a diametrical tip and a slit formed in the tip; a sealing sleeve surrounding the housing for sealing a joint formed between the co-extensive tubular members; and a support structure extending into the valve element to a position adjacent the tip for supporting the flexing portion and preventing the valve element from collapsing so that the check valve permits the flow of fluid in one direction and resists the flow of fluid in an opposite direction.

The above discussed advantages as well as others will become apparent from the several figures and the following description.

BRIEF DESCRIPTION OF THE DRAWINGS

FIG. 2 is an elevational cross-sectional view of the check valve in accordance with a first embodiment of the present invention.

FIG. 3 is an elevational cross-sectional view of the check valve in accordance with a second embodiment of the present invention.

DETAILED DESCRIPTION OF THE PREFERRED EMBODIMENT

Figure 1:
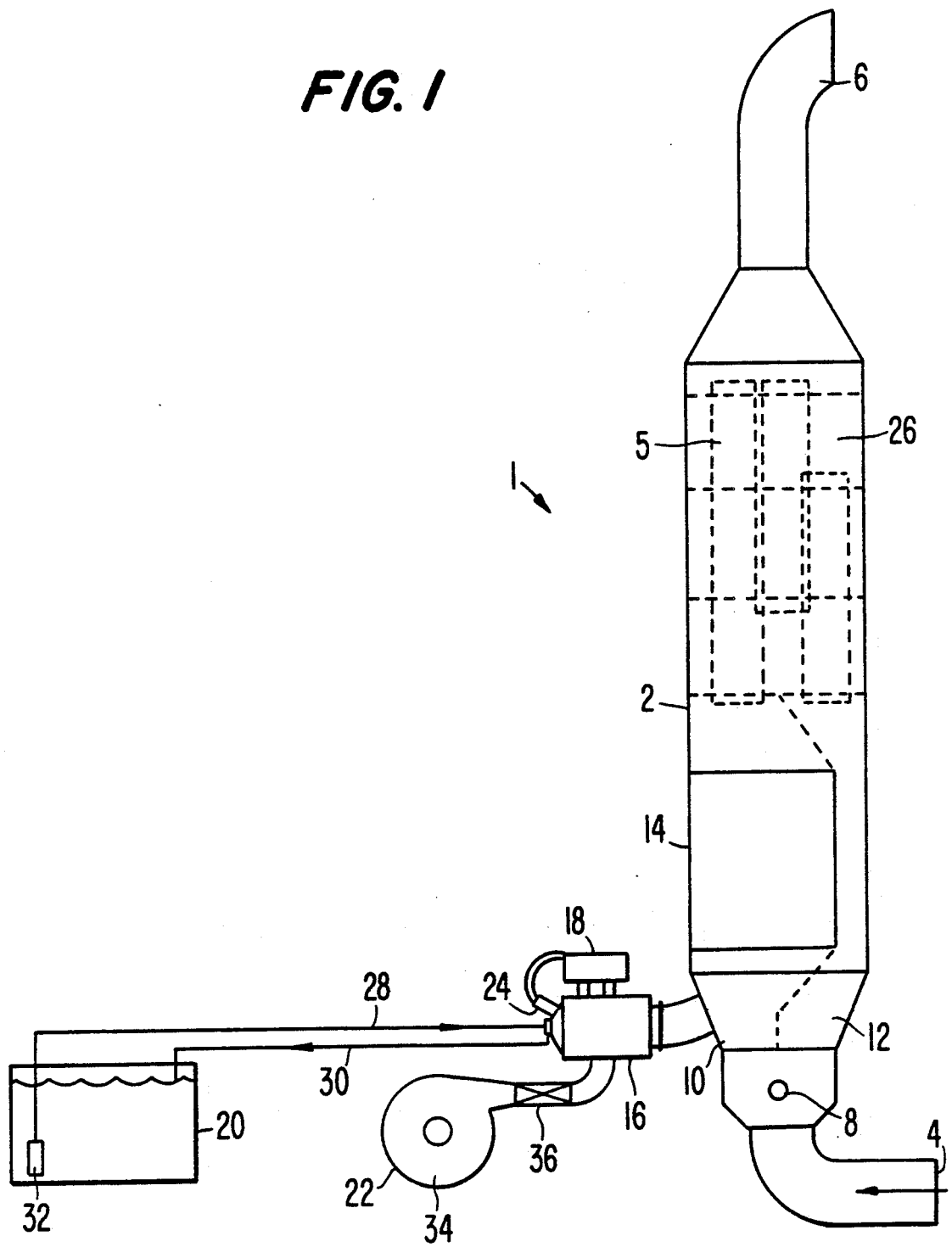
FIG. 1 is a schematic representation of an exhaust gas aftertreatment system in which the check valve in accordance with the present invention is employed.

An integral bypass particulate trap system 1 for reducing particulate emissions from internal combustion engines of the type disclosed in commonly assigned U.S. application Ser. No. 390,884 filed Aug. 8, 1989, and Ser. No. 316,766 filed Feb. 28, 1989, is schematically illustrated in FIG. 1. This integral bypass particulate trap system 1 is of a unitary construction having all of its major components provided within housing 2. By providing such a unitary compact construction, this system may be easily installed within new or existing vehicles and may be readily removed therefrom for repair.

Referring to FIG. 1, the housing 2 includes an inlet 4 and an outlet 6, thus allowing for simple placement within existing exhaust systems. Accommodated within the housing 2 is a diverter valve 8 which allows the exhaust gas emitted from the internal combustion engine (not shown) to flow through either the main flow passage 10 or the by-pass flow passage 12. Within the main flow passage 10 there is positioned a particulate trap 14. The particular design of the particulate trap is not envisioned as part of the present invention and may be of the uncatalyzed wall flow monolith type or of the uncatalyzed ceramic foam type both of which adequately capture the carbonaceous portion of the particulate matter which flows therethrough.

When in the trapping mode, exhaust gas from the internal combustion engine is restricted to flow through the particulate trap 14 located in the main passage 10. In doing so, carbonaceous particulate matter in the engine exhaust is removed by the particulate trap as the exhaust gas passes through the medium of the trap 14 and is then permitted to escape through the vent tube 5 and the outlet 6 to the atmosphere.

Mounted in a position adjacent to the main flow path is a regeneration burner 16 which is periodically activated by a coil 18 for oxidizing the particulate matter trapped in the particulate trap 14. The regeneration burner 16 is a high temperature diesel fuel burner and is located immediately upstream of the particulate trap inlet. The burner 16 may be of the type illustrated in U.S. Pat. No. 4,581,891 discussed above and includes a fuel supply 20, an air supply 22 and igniter 24 which is activated by coil 18. Positioned within the by-pass flow passage 12, which is essentially parallel to the main flow passage 10, is an acoustic section 26. When in the regeneration mode, the diverter valve 8 directs the exhaust gas flow through the by-pass flow passage 12 and subsequently through the acoustic section 26 prior to expulsion to the atmosphere through outlet 6.

Fuel is supplied to the burner 16 by way of the supply line 28 with any unused portion of the fuel being returned to fuel supply 20 by way of return line 30. When the regeneration burner 16 is activated, fuel is pumped through the supply line 28 by way of a burner fuel pump 32 located at the fuel supply 20. Additionally, when the regeneration burner 16 is activated, air is required to form a predetermined air/fuel mixture within the regeneration burner 16, and such air is supplied by an air supply system 34 through the air flow check valve 36.

It is this air flow check valve 36 which constitutes the primary subject of the present invention. FIG. 2 of the drawings illustrates one embodiment of the check valve 36 in accordance with the present invention. The check valve 36 is positioned within a flow passage 38 which extends from the air supply system 34 to the combustion chamber of the regeneration burner 16. The flow passage 38 is formed of a pair of co-extensive tubular members 40 and 42. Air flow generated by the air supply system 34 is directed through the air flow passage 38 in the direction of arrows A. In accordance with the preferred embodiment, the co-extensive tubular members 40 and 42 are formed of a substantially rigid material such as metal or a hardened synthetic material such as plastic. As can be seen from FIG. 2, the air flow check valve 36 further includes a resilient valve element 44 which may be formed of rubber or other resilient synthetic material. In the embodiment illustrated in FIG. 2, the valve element 44 is positioned over an outer surface of the tubular member 40 and held in place there against by a resilient sleeve 46. Hose clamps 48 and 50 may be readily positioned about the resilient sleeve 46 and tightened so as to maintain the valve element 44 in a fixed position relative to the tubular member 40. With this assembly structure, the flow passage 38 may be readily disassembled in order to repair or replace any of the components of the system.

Because the tubular member 40 is formed of a rigid material, this member 40 will support the thick base portion 52 of the valve element 44 and will maintain the base portion 52 in an open and spread apart condition. Additional support of the valve element 44 is provided by the tubular member 42. As can be seen from FIG. 2, the valve element 44 is inserted into the tubular member 42 and in contact with an inner surface of such tubular member.

In order to provide a leak-free environment, the resilient sleeve 46 extends over a portion of the tubular member 42 and in contact therewith so as to fixedly secure the tubular member 42 relative to the tubular member 40. It should be noted that any similar structure may be used for fixedly securing the tubular members 40 and 42 relative to one another.

Figure 4:
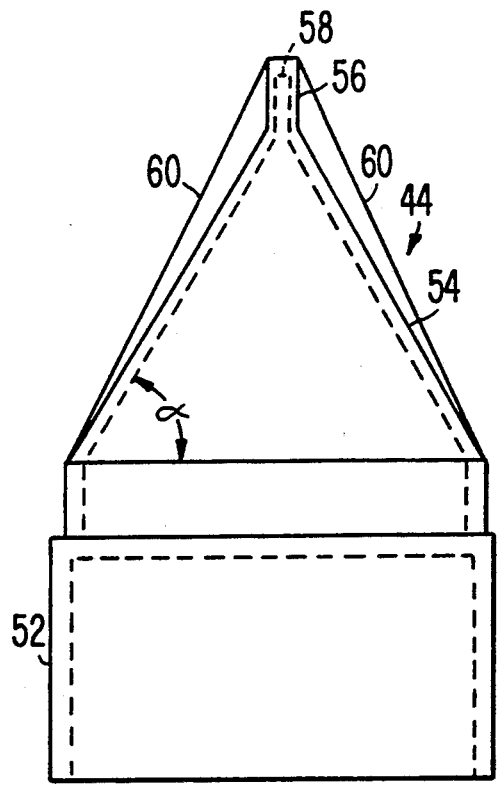
FIG. 4 is an elevational front view of the valve element in accordance with the first embodiment of the present invention.
Figure 5:
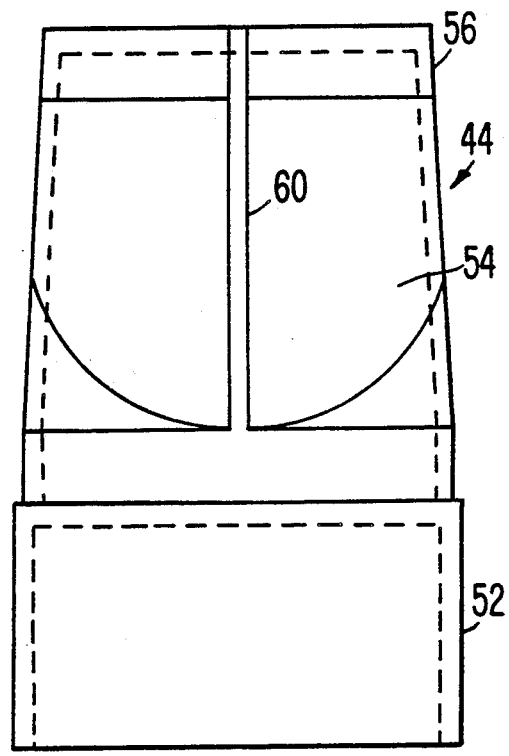
FIG. 5 is a side view of the valve element shown in FIG. 4.

The valve element 44 as is best seen in FIGS. 4 and 5 includes the previously mentioned circular base portion 52 as well as a flexing portion 54 which permits the flow of air in the direction of arrows A and resists the backflow of exhaust gas therethrough. The flexible portion 54 of the valve element 44 extends from the circular base 52 and converges to form a diametrical tip 56. The tip 56 extends diametrically with respect to the circular base portion 52 and includes a diametrical slit 58 which extends substantially the entire length of the tip 56. Because the flexible portion is formed of a relatively thin resilient material, elongated stiffening ribs 60 are provided in order to aid in the stability of the valve element 44. These ribs 60 aid in maintaining the slit 58 of the valve element 44 in a closed position during the trapping mode of the integral by-pass particulate trap system 1. Specifically, when pressure is exerted in a direction opposite that of arrows A, the stiffening ribs are forced in a direction toward one another, consequently pressing the opposing portions of the tip 56 forming the slit 58 against one another, and effectively pressing the slit to a closed condition. It should be noted that the flexible portion 54 converges from the circular base portion 52 to the tip 56 at an angle which may be in the range of 45° to 75° and preferably at an angle of 60°.

Figure 8:
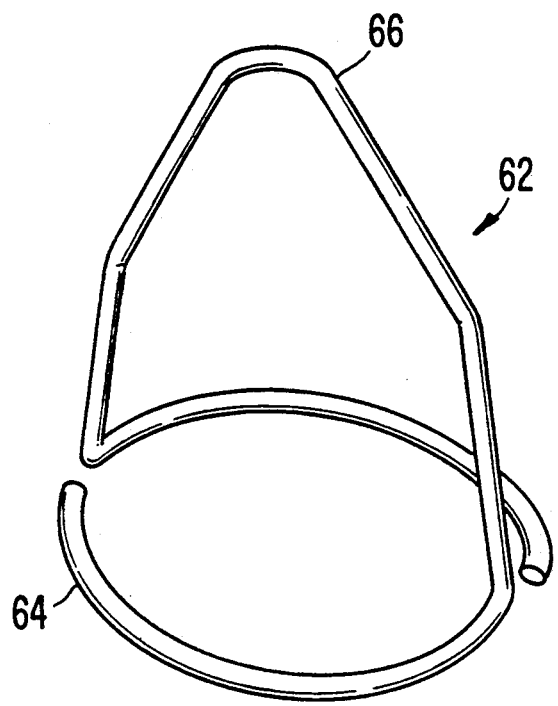
FIG. 8 is a perspective view of the interior support for the valve element in accordance with the present invention.

Because the valve element 44 is formed of a thin resilient material, and that under various operating conditions the back pressure exerted on the valve element 44 by the exhaust gas may overcome the valve element's inherent stability, a support structure 62 which extends into an interior of the valve element 44 is provided. This support structure 62 as best seen in FIG. 8 includes a spring biased circular ring portion 64 and an angular wire 66 extending diametrically across the ring portion 64. In the embodiment shown in FIG. 2, the ring portion 64 is spring biased inwardly so as to contact an outer surface of the tubular member 40 in order to secure the support structure 62 against axial movement relative to the tubular members. The angular wire 66 is positioned perpendicular to a plane including the slit 58 and is essentially coplanar with the ribs 60. The support structure is spaced slightly from the inner surface of the valve element 44 when such valve element is in its relaxed condition. In doing so, this allows for a minimal amount of collapsing of the valve element 44 when subjected to a sufficient back pressure and consequently allows the ribs 60 to press the opposing surfaces of the slit 58 against one another. It should be noted that the support structure 62 may be formed of and take a variety of configurations without departing from the spirit and scope of the present invention. Preferably, the angular wire 66 is formed of a rigid material which is capable of withstanding a significant back pressure.

It should also be noted that the support structure 62 and specifically the angular wire 66 is relatively thin thereby while providing adequate support for the valve element 44, the angular wire 66 will only minimally impede the flow of air in the direction of arrows A.

Figure 6:
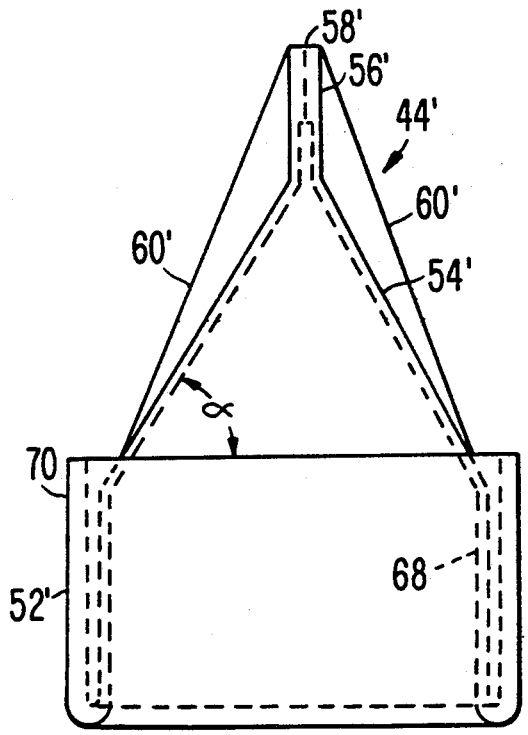
FIG. 6 is an elevational front view of the valve element in accordance with the second embodiment of the present invention.
Figure 7:
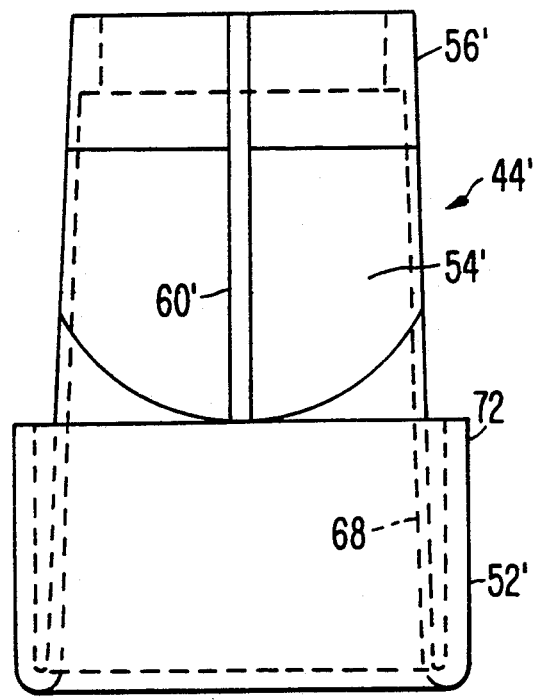
FIG. 7 is a side view of the valve element shown in FIG. 6.

Turning now to FIGS. 3, 6 and 7, the check valve 36' in accordance with an alternative embodiment of the present invention will be described in greater detail. Like that check valve discussed previously, the check valve 36' also includes co-extensive tubular members 40 and 42 for supporting a valve element 44'. As can be seen from these figures, the circular base portion 52' of the valve element 44' is essentially turned inside out such that the circular base portion 52' includes an inner layer 68 and an outer layer 70. The circular base portion is configured in such a manner so as to receive an end of the tubular member 42 therein for maintaining the circular base portion 52' in an open and spread apart condition. Similar to the embodiment shown in FIG. 2, a resilient sleeve 46' is provided in order to sealingly fix tubular member 42 with respect to tubular member 40. The resilient sleeve 46' is positioned to contact and press against an outer surface of the tubular member 40 as well as against the outer layer 70 of the circular base portion 52' in order to press this portion against the tubular member 42. Again, hose clamps 48' and 50' are provided in order to secure the circular base portion 52 relative to the tubular member 42 as well as to fix the tubular member 42 with respect to tubular member 40.

The flexing portion 54' is similar to that portion 54 and extends from the inner layer 68 of the circular base portion 52' and converges to form a diametrically disposed tip 56' which includes a slit 58' similar to that set forth in the embodiment illustrated in FIGS. 4 and 5. The flexing portion 54' similarly extends at an angle from the circular base portion 52' with this angle being in the range of 45° to 75° and preferably 60°. It should also be noted that the inner portion 68 of the circular base 52' extends at an angle relative to the outer layer 70, in the range of 0° to 10°. Preferably inner portion 68 extends at an angle of 2° with respect to the vertically extending outer layer 70 of the circular base portion 52'. As can also be seen from FIGS. 6 and 7, stiffening ribs 60' are provided in order to aid in the stability of the valve element 44'.

The valve element 44' functions in a manner similar to that of valve element 44. Also, extending into the valve element 44' is a support structure 62' which is essentially identical to the support structure 62 and includes a spring biased ring portion 64' and an angular wire 66'. As can be seen from FIG. 3, the ring portion 64' is spring biased outwardly such that the ring portion 64' will contact an inner surface of the tubular member 40 and be axially fixed in the position shown in FIG. 3. In order to facilitate the positioning of the ring portion 64 and 64', a circumferential indentation 72 may be formed in either the inner surface or outer surface of the tubular member 40 dependent upon whether the support structure is to contact the inner or outer surface of the tubular member 40.

As can be seen from the foregoing, the check valves 36, 36' will be capable of withstanding a high degree of back pressure while being formed of a relatively thin flexible material and will be prevented from deforming beyond their elastic limit and which will reliably open and close when necessary. Consequently, in the environment of an exhaust gas aftertreatment system where it is critical to provide the proper amount of air in order to oxidize particulate matter, the air feed pump for such a system will be protected from high exhaust gas temperature and further, leakage of untreated exhaust gas through the air feed pump into the atmosphere will be prevented.

While the invention has been described with reference to preferred embodiments, it should be appreciated by those skilled in the art that the invention may be practiced otherwise than as specifically described herein without departing from the spirit and scope of the invention. It is, therefore, to be understood that the spirit and scope of the invention be limited only by the appended claims.

INDUSTRIAL APPLICABILITY

A check valve of the above mentioned type may be incorporated in any fluid handling system wherein it is desired to prevent the back flow of fluid in a direction contrary thereto. Systems to which the above defined check valve may be readily adapted would be those in which the fluid is passed through the system at a relatively low pressure consequently enabling the check valve to be formed of a relatively thin flexible material. Such a check valve is primarily suitable for fluid distribution systems wherein the fluid is a gas.

What is claimed:

1. In an exhaust gas aftertreatment system having an air supply system comprising
   an air feeding means for selectively creating a flow of air;
   a flow passage for directing the flow of air including at least two coaxial tubular members;
   a valve element having a circular base portion surrounding and supported by one of said coaxial tubular members, a flexing portion extending from said circular base portion and converging to form a tip, and a diametrical slit formed in said tip;
   a sealing means surrounding said flow passage for sealing a joint formed between said coaxial tubular members; and
   a support means extending into said valve element to a position adjacent said tip for supporting said flexing portion;
   wherein said valve element permits the flow of air from said air feeding means in one direction and prevents the flow of exhaust gas in an opposite direction and said support means prevents said valve element from collapsing when said air feeding means is inoperable.

2. The system as defined in claim 1, wherein said coaxial tubular members are rigid and said base portion of said valve element extends along an inner surface of a first of said tubular members and along an outer surface of a second of said tubular members.

3. The system as defined in claim 2, wherein said sealing means is a resilient cylindrical tube and is positioned in contact with an outer surface of said first tubular member and said base portion of said valve member.

4. The system as defined in claim 3, wherein said sealing means is secured in place by a pair of circular clamps.

5. The system as defined in claim 1, wherein said coaxial tubular members are rigid and said base portion of said valve element extends along an inner surface of a first of said tubular members and an outer surface of said first of said tubular members and abuts against an end of a second of said tubular members.

6. The system as defined in claim 5, wherein said sealing means is a resilient cylindrical tube and is positioned in contact with said base portion of said valve member and an outer surface of said second tubular member.

7. The system as defined in claim 6, wherein said sealing means is secured in place by a pair of circular clamps.

8. The system as defined in claim 1, wherein said support means is an angular wire extending from one of said tubular members into said valve element diametrically across said circular base portion.

9. The system as defined in claim 8, wherein said angular wire includes a biasing ring for forcibly contacting said one of said tubular members and maintaining said angular wire in place.

10. The system as defined in claim 9, wherein said angular wire extends perpendicular to a plane including said diametrical slit.

11. A check valve comprising;
a rigid cylindrical housing having first and second coaxial tubular members,
a valve element having a circular base portion surrounding and supported by one of said coaxial tubular members, a flexing portion extending from said circular base portion and converging to form a diametrical tip and a slit formed in said tip;
a sealing means surrounding said housing for sealing a joint formed between said coaxial tubular members; and
a support means extending into said valve element to a position adjacent said tip for supporting said flexing portion;
wherein said check valve permits the flow of fluid in one direction and resists the flow of fluid in an opposite direction and said support means prevents said valve element from collapsing when said flow of fluid is in said opposite direction.

12. The valve as defined in claim 11, wherein said coaxial tubular members are rigid and said base portion of said valve element extends along an inner surface of a first of said tubular members and an outer surface of a second of said tubular members.

13. The valve as defined in claim 12, wherein said sealing means is a resilient cylindrical tube and is positioned in contact with an outer surface of said first tubular member and said base portion of said valve member.

14. The valve as defined in claim 13, wherein said sealing means is secured in place by a pair of circular clamps.

15. The valve as defined in claim 11, wherein said coaxial tubular members are rigid and said base portion of said valve element extends along an inner surface of a first of said tubular members and an outer surface of said first of said tubular members and abuts against an end of a second of said tubular members.

16. The valve as defined in claim 15, wherein said sealing means is a resilient cylindrical tube and is positioned in contact with said base portion of said valve member and an outer surface of said second tubular member.

17. The valve as defined in claim 11, wherein said support means is an angular wire extending from one of said tubular members into said valve element diametrically across said circular base portion.

18. The valve as defined in claim 17, wherein said angular wire includes a biasing ring for forcibly contacting said one of said tubular members and maintaining said angular wire in place.

19. The valve as defined in claim 18, wherein said angular wire extends perpendicular to a plane including said diametrical slit.

20. A valve element for a check valve comprising:
a circular base portion;
a flexing portion extending from said circular base portion and converging to form a diametrical tip;
a diametrical slit formed in said tip for permitting the flow of fluid in a first direction;
and a support means extending into said valve element to a position adjacent said tip for supporting said flexing portion, said support means being an angular wire extending into said valve element diametrically across said circular base portion.

21. The valve element as defined in claim 20, wherein said angular wire extends perpendicular to a plane including said diametrical slit.

22. The valve element as defined in claim 20, further comprising a pair of diametrically opposed elongated stiffening ribs formed in said flexing portion.

23. The valve element as defined in claim 22, wherein said diametrically opposed elongated stiffening ribs extend axially along said flexing portion, and a plane including said stiffening ribs extends perpendicular to a plane including said diametrical slit.

* * * * *